United States Patent [19]

Cooney

[11] Patent Number: 5,048,397

[45] Date of Patent: Sep. 17, 1991

[54] IN-LINE HYDRAULIC PRESSURE INTENSIFIER

[76] Inventor: Leo A. Cooney, 459 Washington Rd., Grosse Pointe, Mich. 48230

[21] Appl. No.: 585,243

[22] Filed: Sep. 19, 1990

Related U.S. Application Data

[63] Continuation-in-part of Ser. No. 329,795, Mar. 28, 1989, Pat. No. 4,976,190.

[51] Int. Cl.[5] ............................................. F15B 11/00
[52] U.S. Cl. ...................................... 91/535; 60/563; 60/591
[58] Field of Search ................ 60/584, 562, 563, 567, 60/574, 579, 581, 591; 91/535; 303/84.1

[56] References Cited

U.S. PATENT DOCUMENTS

| | | | |
|---|---|---|---|
| 2,399,270 | 4/1946 | Vickers | 60/563 |
| 2,737,777 | 3/1974 | Krusemark | 60/563 |
| 2,909,035 | 10/1959 | Mitton | 60/563 |
| 3,021,807 | 2/1962 | Glas | 60/563 |
| 3,276,206 | 10/1966 | Calkins | 60/563 |
| 3,410,090 | 11/1968 | Thirion | 60/563 |
| 3,425,222 | 2/1969 | Cooney et al. | 60/563 |
| 3,473,328 | 10/1969 | Mayhew | 60/563 |
| 3,478,518 | 11/1969 | Langerquist | 60/563 |
| 3,857,243 | 12/1974 | Douglas | 60/563 |
| 3,942,326 | 3/1976 | Hayashida | 60/563 |

FOREIGN PATENT DOCUMENTS 0021376 2/1978 Japan ........................... 60/563

Primary Examiner—Edward K. Look
Assistant Examiner—Thomas Denion
Attorney, Agent, or Firm—Reising, Ethington, Barnard, Perry & Milton

[57] ABSTRACT

The subject invention comprises a hydraulic pressure intensifier (10) including a cylinder (42) having a fluid inlet (44) at one end and a fluid outlet (46) at the other end. Two telescopically disposed pistons (54, 56) are slideably supported between the inlet (44) and outlet (46) ends of the cylidner (42). A spring (60) extending axially through the cylinder (42) urges the pistons (54, 56) toward the inlet end (44) of the cylinder (42). A spring biased valve member (70) seals a flow passage (62) extending through the pistons (54, 56) when the fluid pressure reaches approximately 150 psi at the inlet (44) to the cylinder (42). A pin (68) fixed to the inlet end (44) of the cylinder (42) actuates the valve member (70). The pistons (54, 56) move first in unison and then separately toward the outlet end (46) of the cylinder (42) as the hydraulic pressure increases at the inlet end (44). The valve member (70) includes a frustoconical sealing portion (72) which matingly engages a frustoconically shaped seat surface (64) in the flow passage (62) for full surface-to-surface engagement to positively prevent fluid leakage through the flow passage (62) at elevated pressures.

6 Claims, 7 Drawing Sheets

RATIO OF PRESSURE
INLET PRESSURE VS. OUTLET PRESSURE

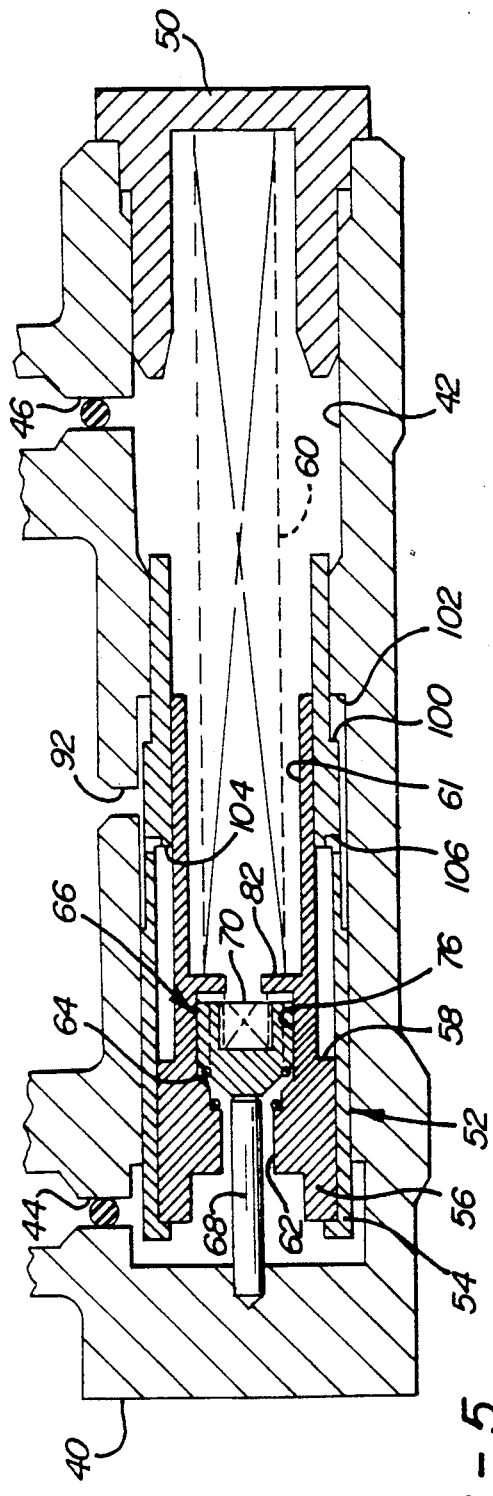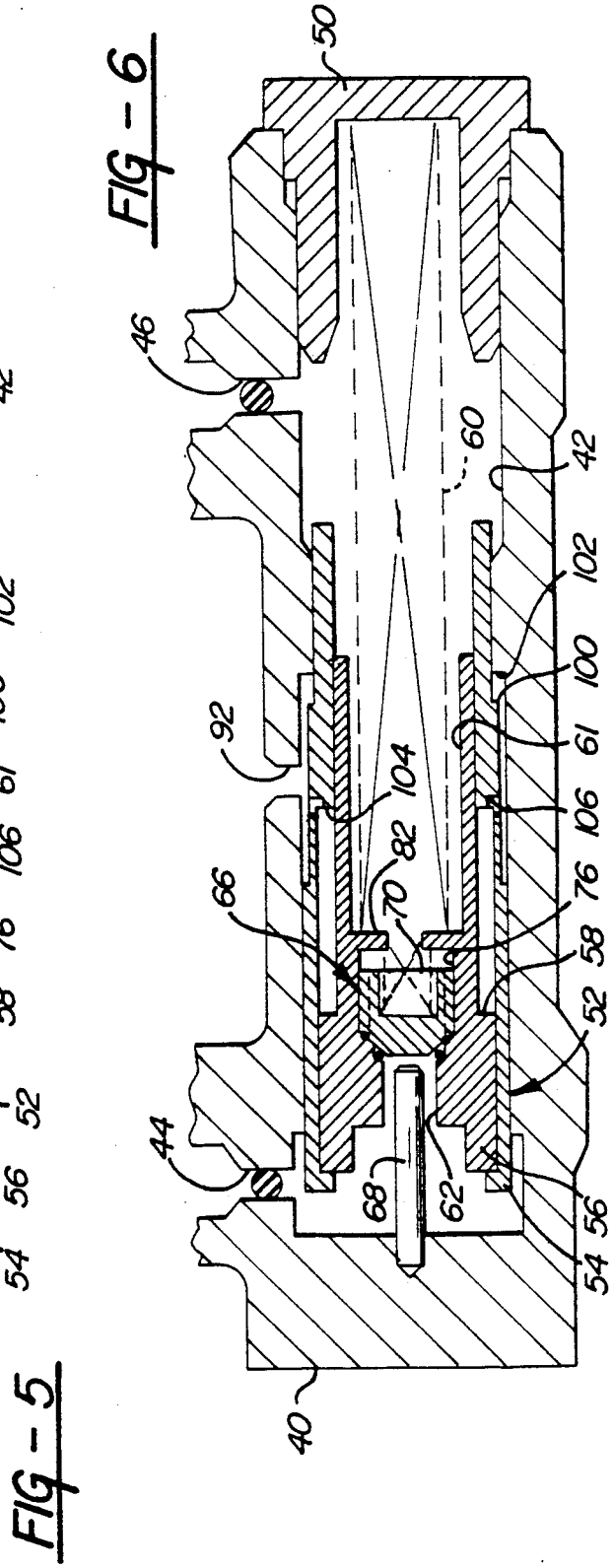

RATIO OF PRESSURE
INLET PRESSURE VS. OUTLET PRESSURE

IN-LINE HYDRAULIC PRESSURE INTENSIFIER

RELATED APPLICATIONS

This a continuation-in-part application of U.S. Ser. No. 329,795, filed Mar. 28, 1989 now U.S. Pat. No. 4,976,190.

TECHNICAL FIELD

The subject invention relates to hydraulic braking systems, and more particularly to an improved valve member disposed in a brake pressure intensifying apparatus of a vehicular braking system.

BACKGROUND ART

Multistage hydraulic pressure boosters for use in vehicular braking systems are relatively well known in the prior art. Such pressure boosters, or intensifiers, employ a system of concentric pistons to obtain a gradual boost in wheel cylinder pressure, providing a brake pedal feel comparable to that provided by power assisted vehicular braking systems. Such prior art pressure intensifiers are illustrated in the U.S. Pat. Nos. 3,101,282 and 3,010,238 to Jansson, and the U.S. Pat. No. 3,425,222 to Cooney, issued Feb. 4, 1969. These references disclose a self-contained apparatus installed along the brake fluid line extending between the master cylinder and the wheel cylinders of a vehicle. A cylindrical chamber surrounds two concentric pistons slideably disposed in the cylinder. A compression spring biases the two pistons toward a fluid inlet end of the cylinder. A spring-loaded ball valve is disposed inside the inner piston.

The brake pressure intensifier is actuated by fluid pressure delivered from the master cylinder. When an operator of the vehicle applies force to the brake pedal, fluid pressure from the master cylinder is transmitted to the inlet end of the pressure intensifier apparatus, moving the brake fluid straight through both concentric pistons and the check valve to the wheel cylinders without providing any pressure intensification. When a predetermined level of pressure is exerted from the master cylinder, the two concentric pistons move together against the biasing pressure of the spring and allow the ball valve to close. This movement gradually increases the fluid pressure due to the fact that the inlet ends of each of the two concentric pistons are larger in diameter than at their respective outlet ends. As pressure increases in the master cylinder, the two pistons continue to move until the outer piston is stopped by an annular ledge extending inwardly from the cylinder. The inner piston, however, is not so restrained and continues to move in the cylinder.

As shown in the above-referenced prior art patents, a spherical valve member is provided in the ball valve. It has been found that at high pressures, fluid leakage is experienced between the spherical ball and its associated seat surface in the flow passage. This fluid leakage results in decreased operating efficiency and a reduction in the pressure intensifying characteristics.

SUMMARY OF THE INVENTION AND ADVANTAGES

The subject invention provides a hydraulic pressure intensifying apparatus of the type for boosting the hydraulic pressure in a vehicular braking system. The apparatus comprises a fluid cylinder extending axially between an inlet end and an outlet end. A first piston is slideably disposed in the cylinder. The first piston includes a first forward end area adjacent the inlet end and a first rearward end area smaller than the first forward end area adjacent the outlet end. A second piston is disposed for telescopic sliding movement within the first piston. The second piston includes a second forward end area adjacent the inlet end and a second rearward end area smaller than the second forward end area adjacent the outlet end. A flow passage communicates hydraulic fluid between the inlet and outlet ends of the cylinder. A valve means is moveable between open and closed positions for preventing fluid flow through the flow passage when in the closed position. The first and second pistons have a combined forward end area when the valve means is in the closed position. The first and second pistons have a combined rearward end area when the valve means is in the closed position. The invention is characterized by the ratio between the first forward end area and the first rearward end area being between 60% percent and 70% percent of the ratio of the combined forward end area and the combined rearward area. Also, the ratio between the combined forward end area and the combined rearward end area is between 80% and 90% of the ratio between the second forward end area and the second rearward end area.

It has been found that a unique and gradual pressure amplification can be achieved when the aforesaid critical ranges are maintained for the ratios between the first forward and rearward end areas, the second forward and rearward end areas and the combined forward and rearward end areas. When the various piston ratios are determined according to the said critical ranges, a more smooth pressure intensification is yielded, as compared to the prior art. Further, the subject invention made in accordance with the said critical ranges provides a safer apparatus in that a regular, predictable pressure amplification will result thereby reducing the tendency of producing an over-braking or under-braking condition.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is an enlarged cross-sectional view of the concentric pistons of the subject apparatus at a first stage of operation;

FIG. 6 is an enlarged cross-sectional view of the concentric pistons at a second progressive stage of operation;

DETAILED DESCRIPTION OF THE PREFERRED EMBODIMENT

Figure 1:
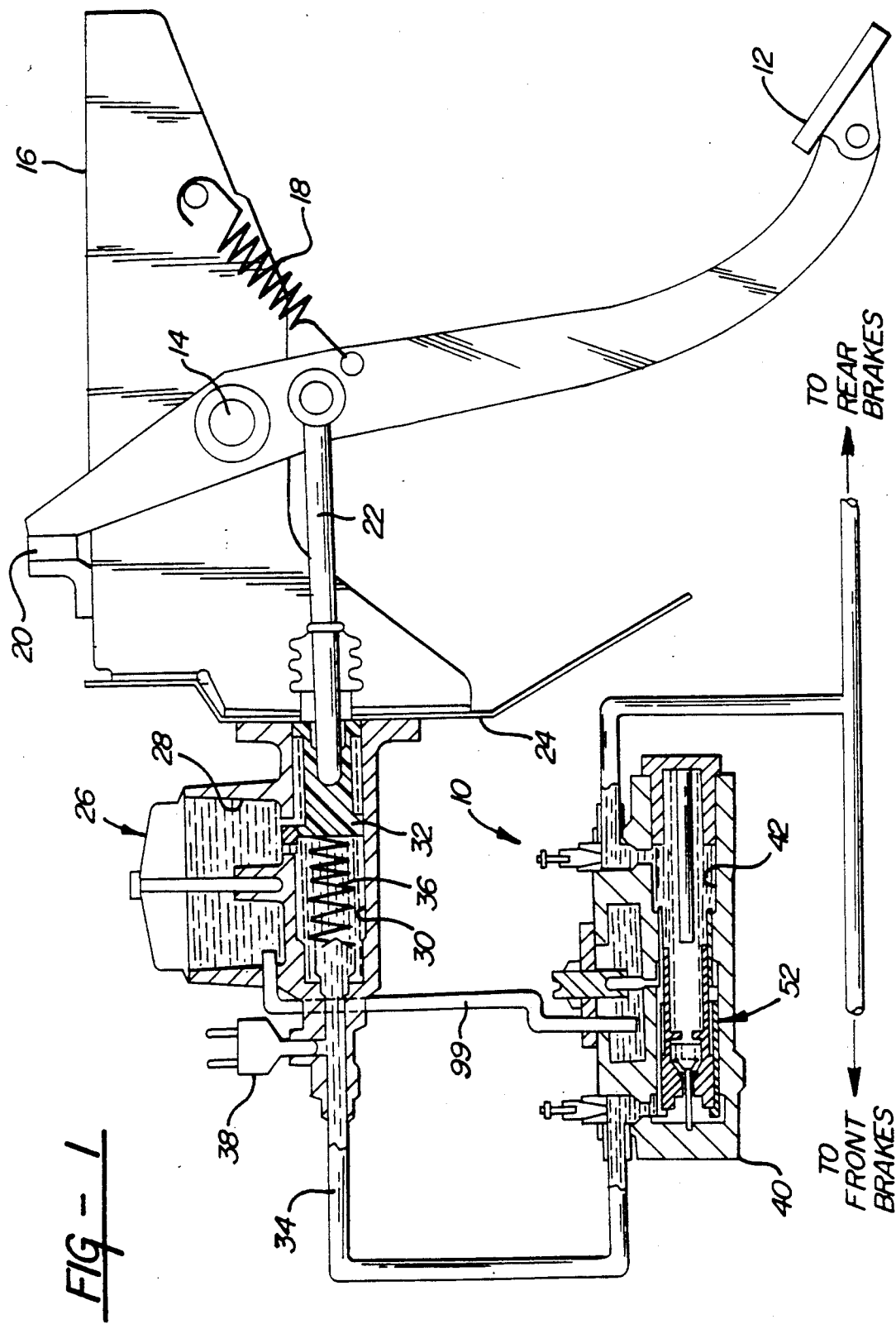
FIG. 1 is a schematic diagram of a vehicular braking system including the hydraulic brake pressure intensifier apparatus of the subject invention.

Referring the Figures, wherein like numerals indicate like or corresponding parts throughout the several views, a hydraulic brake pressure intensifier apparatus according to the subject invention is generally shown at 10. A schematic diagram of a vehicular hydraulic braking system is shown in FIG. 1. It will be appreciated by those skilled in the art that the present invention 10 may be practiced in other types of braking systems than that shown in FIG. 1. The vehicular braking system includes a brake pedal 12 pivotally attached about a pivot axis 14 to a portion of a vehicle 16. An extension spring 18 extends between the brake pedal 12 and the bracket portion of the vehicle 16 for urging the brake pedal 12 toward a fixed stop member 20. A push rod 22 is pivotally attached to the clutch pedal 12 and extends through a fire wall portion 24 of the vehicle 16.

A master cylinder assembly 26 is fixedly attached to the engine compartment side of the fire wall 24, opposite the brake pedal 12. The master cylinder 26 includes a hydraulic fluid reservoir 28 disposed above and in fluid communication with a cylinder 30. A piston 32 is slideably disposed in the cylinder 30 for urging fluid out of the cylinder 30 and into an associated brake fluid line 34. The push rod 22 connected to the brake pedal 12 extends to the piston 32 of the master cylinder 26 so that as an operator applies pressure to the brake pedal 12, the piston 32 in the cylinder 30 urges hydraulic fluid into the brake line 34. A return spring 36 is disposed in the cylinder 30 for urging the piston 32 toward an unactuated position in the cylinder 30 as pressure on the brake pedal 12 is decreased. A fluid pressure sensor 38 communicates with the brake line 34, downstream of the master cylinder 26, for sending a signal to a warning light or gauge visible to the operator of the vehicle to alert the operator in the event brake fluid pressure decreases below a minimum value. The brake line 34 extends from the master cylinder 26 to each of the brake actuators (not shown) at the four wheels of the vehicle 16.

Figure 2:
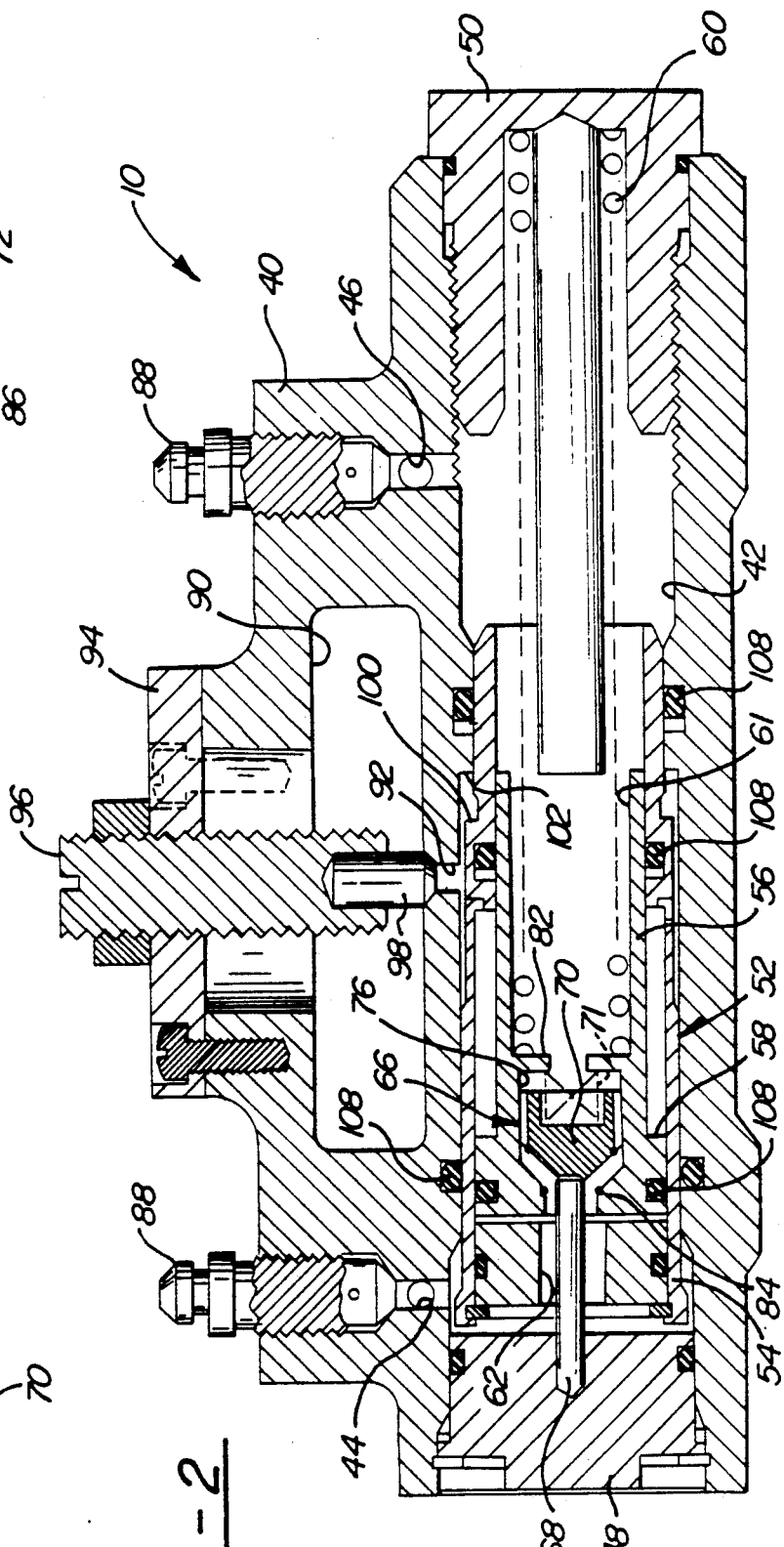
FIG. 2 is a cross-sectional view of the subject hydraulic brake pressure intensifier apparatus.

The subject brake pressure intensifier apparatus 10 communicates with the brake fluid in the brake line 34, downstream of the master cylinder 26 and upstream of the brake actuators associated with the wheels of the vehicle 16. The apparatus 10 is best shown in FIG. 2 and includes a cast iron housing 40. A fluid cylinder 42 extends longitudinally through the housing 40. At one end of the cylinder 42 is disposed an inlet 44, and at the other end is disposed a fluid outlet 46. For ease of manufacture, the cylinder 42 extends completely through the housing 40, with a first cap 48 and a second cap 50 disposed adjacent the inlet 44 and outlet 46 ends, respectively, to provide a fluid-tight seal and thereby prevent leakage of hydraulic fluid from the housing 40 even at elevated pressures.

A piston means, generally indicated at 52 in FIG. 2, is slideably disposed along the axis of the cylinder 42. The piston means 52 is responsive to fluid pressure adjacent the inlet end 44 of the cylinder 42 for providing a gradual, non-linear fluid pressure boost at the outlet end 46 of the cylinder 42. As will be later described in detail, the piston means 52 boosts the inlet pressure in a smoothly transitioning manner, and applies this boosted pressure to the brake actuators at the wheels. More particularly, as an operator of the vehicle 16 applies pressure to the brake pedal 12, the master cylinder piston 32 is moved in its cylinder 30 to create a fluid pressure in the brake line 34. The fluid pressure created by the master cylinder piston 32 is linear in nature, wherein the pressure created in the brake line 34 is directly proportional to the amount of pressure applied to the brake pedal 12. Therefore, as the pressure applied to the brake pedal 12 is increased, the fluid pressure in the brake line 34 is increased in a directly proportional manner.

However, the piston means 52 of the subject apparatus 10 amplifies the pressure exiting the apparatus 10 at a nonlinear, or nonproportional, rate so that as the fluid pressure in the brake line 34 increases, the fluid pressure created at the outlet end 46 of the cylinder 42 gradually increases in a nonlinear manner exceeding the fluid pressure at the inlet end 44 of the cylinder 42. The result is that an operator of the vehicle 16 experiences a braking action which is smoothly related to the applied brake pedal 12 pressure. Light pressure applied to the brake pedal 12 will not cause the vehicular brakes to grab, and greater pressure applied to the brake pedal 12 will produce a fast controlled stop of the vehicle 16. Therefore, the operator of the vehicle 16 can more easily control skidding or wheel locking of the vehicle 16 and thus, more safely maneuver the vehicle 16 during emergency conditions. Additionally, the brake fade phenomena is measurably eliminated and pedal travel is not increased to an excessive point. Further, the vehicle braking system will work equally well whether the engine is running or not running.

The piston means 52 of the subject invention 10 comprises a first piston 54 which is slideably disposed along the axis of the cylinder 42. The first piston 54 includes a first forward end 54a adjacent the inlet end 44 of the cylinder 42 and a first rearward end 54b adjacent the outlet end 46 of the cylinder 42. A second piston 56 is telescopically disposed inside the first piston 54. The second piston 56 includes a second forward end 56a adjacent the inlet end 44 of the cylinder 42 and a second rearward end 56b adjacent the outlet end 46 of the cylinder 42. The first 54 and second 56 pistons, therefore, are concentric within the cylinder 42 and are adapted for free sliding movement therein. The first piston 54 is a generally tubular, or thin-walled, member having a series of internal and external steps, or diameter variations, for reasons to be addressed subsequently. Similarly, the second piston 56 includes at least one external step, or rim, 58 for reasons to be addressed subsequently.

The first forward end 54a of the first piston 54 presents an annular first forward end area comprising the net area over which fluid pressure in the cylinder 42 may act to exert a resultant force on the first piston 54 alone. Similarly, the first rearward end 54b of the first piston 54 presents an annular first rearward end area comprising the net annular area over which fluid pressure in the cylinder 42 may act to exert a force to urge the first piston 54 toward the inlet end 44 of the cylinder 42. Likewise, the second piston 56 presents a full circular second forward end area at its second forward end 56a, and a full circular second rearward end area at its second rearward end 56b.

A biasing means 60 is disposed in the cylinder 42 for urging the piston means 52 axially toward the inlet end 44 of the cylinder 42. The biasing means 60 preferably comprises a compression spring 60 having one end seated in a recess in the second cap 50 and extending axially through the cylinder 42 to the second piston 56. The second piston 56 includes an inner cylindrical recess 61 which telescopically receives a substantial portion of the compression spring 60 to support the compression spring 60 during operation.

A flow passage 62 extends axially through the piston means 52 for communicating hydraulic fluid between the inlet end 44 and the outlet end 46 of the cylinder 42. More particularly, the flow passage 62 is centrally disposed through both the first piston 54 and the second piston 56 along the axis of the cylinder 42 for allowing hydraulic fluid to flow directly through the cylinder 42 from the inlet end 44 to the outlet end 46. The flow passage 62 includes a seat surface 64 for reasons to be addressed subsequently.

A valve means is generally indicated at 66 in FIG. 2. The valve means 66 seals fluid flow through the flow passage 62 in response to a predetermined fluid pressure adjacent the inlet end 44 of the cylinder 42. For this reason, the end areas of the second piston 56 are said to be full circular, i.e., when the valve means 66 is closed, whereas the end areas of the first piston 54 are annular irrespective of whether the valve means 66 is open or closed. The valve means 66 includes a pin 68 extending along the axis of the cylinder 42 and having an end fixed to the first cap 48. The pin 68 extends centrally through a portion of the flow passage 62 to engage a valve member 70. A spring 71 urges, or biases, the valve member 70 toward the seat surface 64 of the flow passage 62. However, when the first 54 and second 56 pistons are in the position shown in FIG. 2, the pin 68 maintains the valve member 70 in a spaced position from the seat surface 64 in the flow passage 62 to allow fluid flow therethrough.

The subject invention is characterized by the valve member 70 having a frustoconical sealing portion 72, and by the seat surface 64 of the flow passage 62 having a matingly shaped surface for mating engagement with the frustoconical sealing portion 72 of the valve member 70 to seal fluid flow through the flow passage 62 at elevated pressures. It has been found that leakage can occur around the valve member at extremely elevated pressures in the prior art devices. Therefore, the subject invention provides an improved valve means 66 which will not allow hydraulic fluid to leak past the valve member 70 at elevated pressures.

Figure 4:
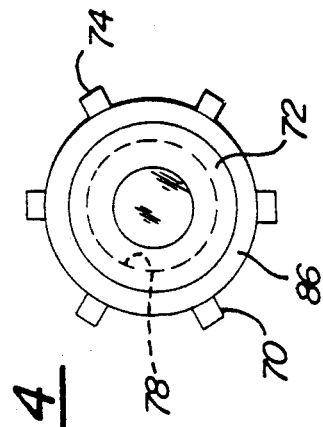
FIG. 4 is an end view of the frustoconical valve member of FIG. 7.
Figure 3:
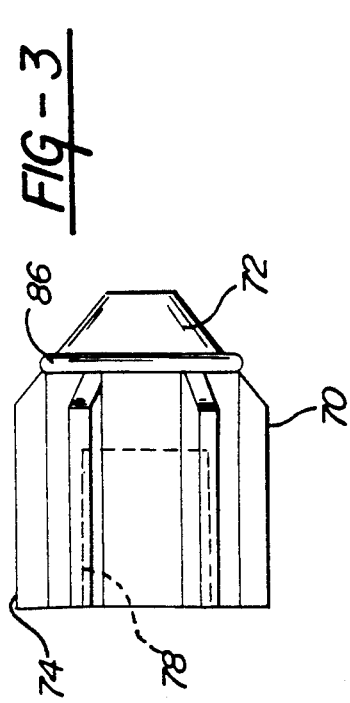
FIG. 3 is a side view of the frustoconical valve member of the subject invention.

As perhaps best shown in FIGS. 3 and 4, the valve member 70 includes a splined guide portion 74 extending axially from the frustoconical sealing portion 72. The crests of the splines of the guide portion 74 engage an inner wall 76 in the second piston 56. The splines of the guide portion 74, therefore, provide guided axial movement of the valve member 70 in the flow passage 62, while allowing hydraulic fluid to flow between adjacent splines. This guided linear movement prevents the valve member 70 from becoming upset, or cocked, inside the recess 76. Therefore, the guide portion 74 functions as a means for aligning the frustoconical sealing portion 72 and the frustoconical seat surface 64 of the flow passage 62 to ensure perfect mating alignment during operation, and thereby maintaining optimal sealing characteristics. A cylindrical recess 78 extends axially through one end of the valve member 70, opposite the frustoconical sealing portion 72. A small compression spring 80 is disposed in the recess 78 of the valve member 70 and extends to a plate-like wall 82 of the second piston 56. The spring 80 urges the valve member 70 toward the seat surface 64 of the flow passage 62.

The frustoconical sealing portion 72 of the valve member 70 and the frustoconical seat surface 64 of the flow passage 62 are disposed at the same conical angle so that full surface-to-surface contact is achieved to provide the superior sealing capabilities. For further enhancing the sealing capabilities, an O-ring 84 is disposed in the frustoconical seat surface 64 of the flow passage 62, adjacent the smallest diameter portion thereof. Similarly, an O-ring 86 is disposed in the frustoconical sealing portion 74 of the valve member 70, adjacent the largest diameter portion thereof. As best illustrated in FIG. 3, the O-ring 86 of the valve member 70 has an outer peripheral extent slightly smaller than the root diameter of the splined guide portion 74. This allows full, unrestricted fluid flow past the valve member 70. Only a portion of the O-ring 86 extends beyond, or outwardly from, the frustoconical sealing portion 72. Similarly, only a portion of the O-ring 84 extends beyond the frustoconical seat surface 64. As the valve member 70 engages, or mates with, the seat surface 64 of the flow passage 62, the two O-rings 84, 86 do not contact each other, but rather engage the associated frustoconical surface of the other member. The portions of the O-rings 84, 86 extending beyond their respective surfaces 64, 72 flatten as the two surfaces 64, 72 are pressed together under the hydraulic pressure. The flattening phenomena of the O-rings 84, 86 occurs only when the frustoconical surface of the seat 64 engages the frustoconical surface of the sealing portion 72. Therefore, dual O-ring sealing is provided, as well as surface-to-surface contact between the frustoconical sealing portion 72 and the seat surface 64 so that fluid sealing is positively established thereby preventing leakage even at extremely elevated pressures.

When the valve member 70 closes the flow passage 62, the first 54 and second 56 pistons may move simultaneously, i.e., in unison, in the cylinder 42. The first 54 and second 56 pistons have a combined forward end area when moving in unison comprising the full circular area of the first forward end 54a of the first piston 54. Said another way, the combined forward end area is equal to the arithmetic sum of the annular first forward end area and the concentric circular second forward end area. Likewise, when the first 54 and second 56 pistons move together, they create a combined rearward end area comprised of the full circular area of the first rearward end 54b. Or, in other terms, the combined rearward end area is equal to the arithmetic sum of the annular first rearward end area and the first forward end area.

Returning to FIG. 2, two air bleeding nipples 88 are shown threaded through the housing 40 and communicating, respectively, with the inlet 44 and outlet 46 ends of the cylinder 42. In the conventional manner, trapped air is exhausted from the vehicular braking system, and in particular, the subject apparatus 10, through the nipples 88.

The housing 40 also includes a fluid chamber 90 disposed above the cylinder 42. A small passage 92 extends between the cylinder 42 and chamber 90 for communicating hydraulic fluid therebetween. A cover 94 is disposed over the chamber 90 and fastened with screws into the housing 40. A lockout screw 96 is threaded through the cover 94 and extends toward the passage 92 in the chamber 90. The lockout screw 96 includes a nose portion 98 adapted to seal the passage 92 and thereby act as a valve to hydraulically lock the piston means 52 in the unactuated (FIG. 2) position. A fluid transfer tube 99 communicates brake fluid between the chamber 90 and the reservoir 28 of the master cylinder 26. Therefore, when an access of fluid builds up in the chamber 90, the transfer tube 99 conveys the excess fluid back to the master cylinder 26.

Referring now to FIGS. 5–8, the operation of the preferred embodiment of the subject apparatus will be addressed presently. In FIG. 5, an enlarged cross-section of the cylinder 42 and piston means 52 of the subject apparatus 10 is illustrated in an unactuated, or low pressure position. The first 54 and second 56 pistons are disposed in this unactuated position whenever the brake pedal 12 is not actuated or actuated only slightly so as to produce pressures up to about 150 pounds per square inch at the inlet end 44 of the cylinder 42. With the piston means 52 in this position, the pin 68 presses the spring biased valve member 70 into a separated, or spaced, condition from the seat surface 64 of the flow passage 62 in order to form a path for fluid flow from the inlet end 44 to the outlet end 46 of the cylinder 42. The pistons 54, 56 remain in this unactuated condition until a sufficient pressure has been established in the brake line 34. Until the pistons 54, 56 are moved from this unactuated condition, hydraulic brake fluid flows freely through the apparatus 10 to the wheel cylinder actuators so that no pressure boost, or pressure multiplication, is realized.

When the fluid pressure in the brake line 34, created at the master cylinder 26, exceeds a predetermined value, for example, 150 pounds per square inch, the fluid pressure acting on the first 54 and second 56 pistons begins to overcome the biasing pressure of the spring 60 and thereby urge, in unison, the first 54 and second 56 pistons axially toward the outlet end 46 of the cylinder 42. As shown in FIG. 6, when the first 54 and second 56 pistons have moved a sufficient distance in the cylinder 42, the pin 68 separates from the valve member 70 and allows the frustoconical sealing portion 74 of the valve member 70 to seat against the seat surface 64 in the flow passage 62. When this occurs, the hydraulic fluid in the brake line 34 between the master cylinder 26 and the inlet end 44 of the cylinder 42 becomes isolated from, or separated from, the hydraulic fluid in the brake line 34 extending from the outlet end 46 to the brake actuators at the wheels of the vehicle 16. As soon as the valve means 66 isolates the fluid between the inlet end 44 and the outlet end 46 of the cylinder 42, the pressure intensification, or boosting, phenomena can be achieved.

More particularly, the first rearward end area of the first piston 54 is smaller than the first forward end area of the first piston 54. Because fluid pressure is inversely proportional to the cross-sectional area over which a force is exerted thereon, a pressure amplification, or intensification, occurs between the inlet 44 and outlet 46 ends as the first piston 54 moves in the cylinder 42.

Figure 7:
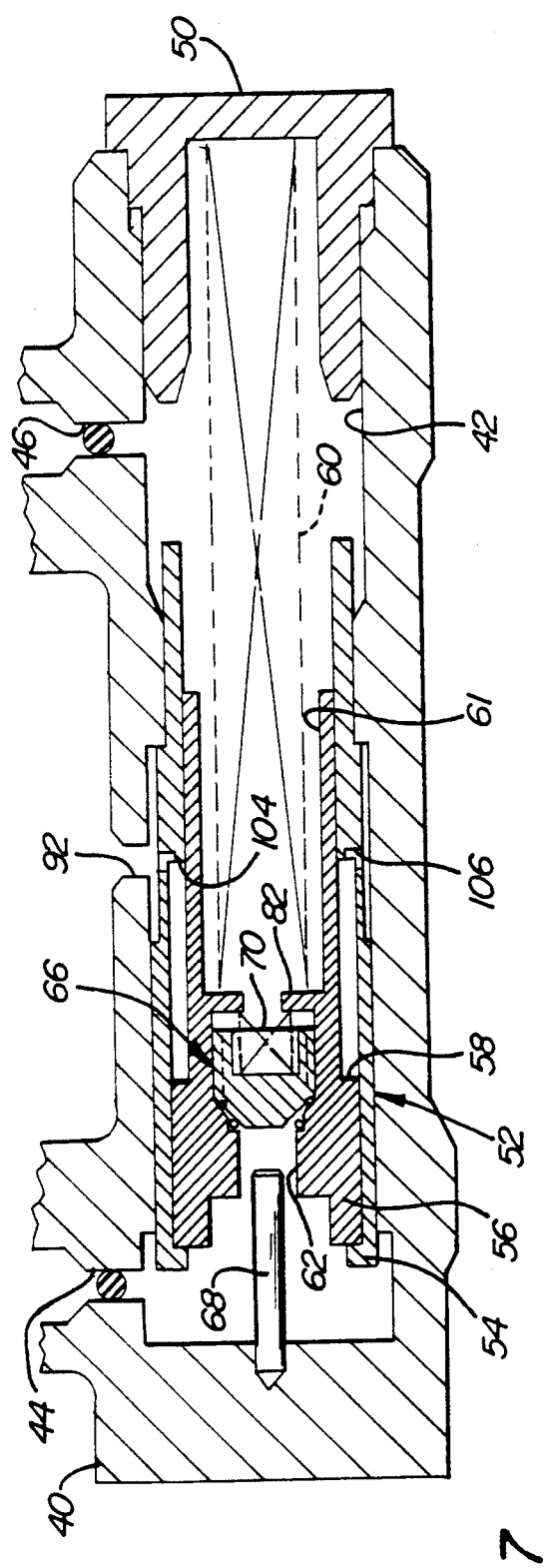
FIG. 7 is an enlarged cross-sectional view of the concentric pistons at a third progressive stage of operation.

The first piston 54 includes a first outer annular ledge 100 which is adapted to engage a corresponding annular ledge 102 extending radially inwardly from the cylinder 42. As shown in FIG. 7, continued movement of the first piston 54 toward the outlet end 46 of the cylinder 42 brings into contact the first ledge 100 and the cylinder ledge 102. This, of course, prevents further axial movement of the first piston 54 toward the outlet end 46 of the cylinder 42. However, the second piston 56 is still free to move toward the outlet end 46 within the first piston 54.

Figure 8:
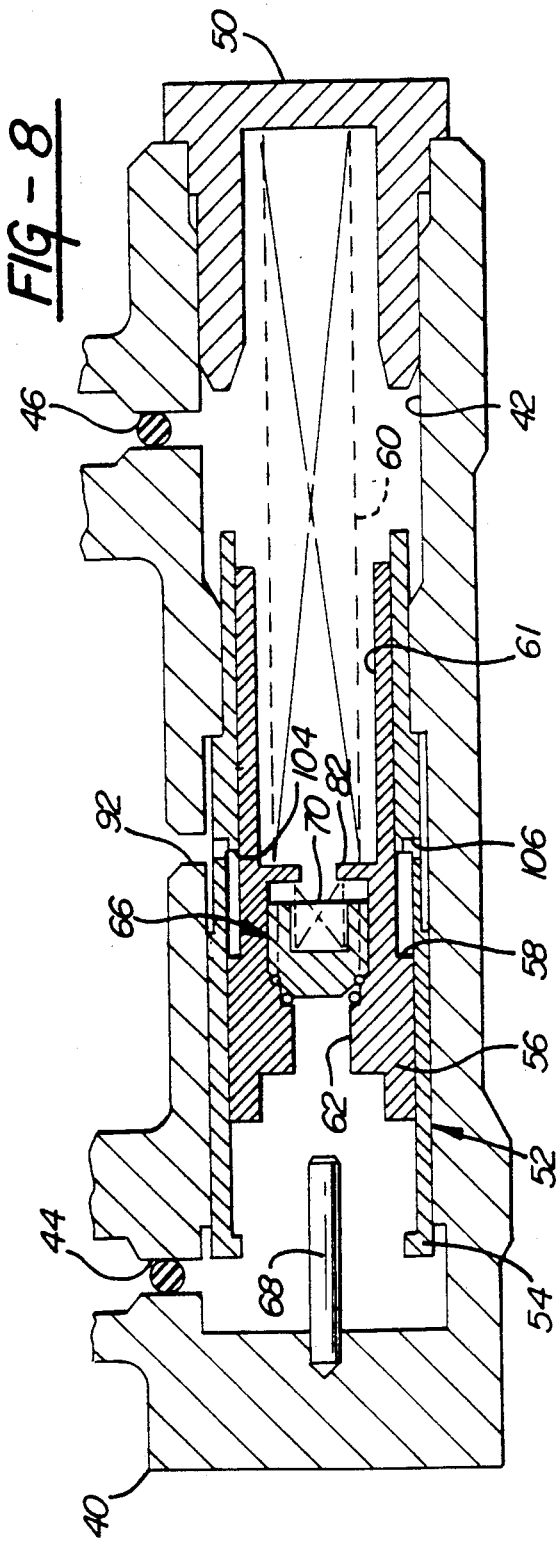
FIG. 8 is an enlarged cross-sectional view of the concentric pistons at a fourth progressive stage of operation.

As shown in FIG. 8, a continued pressure increase at the inlet end 44 of the cylinder 42 urges the second piston 56 axially in the cylinder 42 relative to the first piston 54. This results in a further pressure boost, as the second rearward end area of the second piston 56 is smaller than the second forward end area. It will be appreciated, however, that as the first 54 and second 56 pistons move in the cylinder 42, they will tend to slide relative to each other. That is, the pistons 54, 56 will move in an alternating step-like manner yielding a smooth and gradual pressure intensification.

It has been found that a unique and gradual pressure amplification can be achieved when certain critical ranges are maintained for the ratios between the first forward and rearward end areas, the second forward and rearward end areas and the combined forward and rearward end areas. Specifically, it has been determined that the ratio between the first forward end area and the first rearward end area must be between 60 and 70 percent of the ratio of the combined forward end area and the combined rearward end area. Also, the ratio between the combined forward end area and the combined rearward end area must be between 80 percent and 90 percent of the ratio between the second forward end area and the second rearward end area.

For example, in order to achieve the unique pressure amplification characteristics, a first piston 54 may be selected having a 1:1.5 ratio between its forward end area and its rearward end area. That is, the annular first forward end area would be 1.5 times larger than the annular first rearward end area. Therefore, applying this ratio for the first piston 54 to the critical ranges specified above, the combined piston ratio, i.e., the first 54 and second 56 pistons moving together, must be between 1:2.5 (60%) and 1:2.1 (70%). Further, the second piston 56 must have a ratio between its respective end areas of between 1:3.1 (80% for 1:2.5) and 1:2.3 (90% for 1:2.1).

Figure 9:
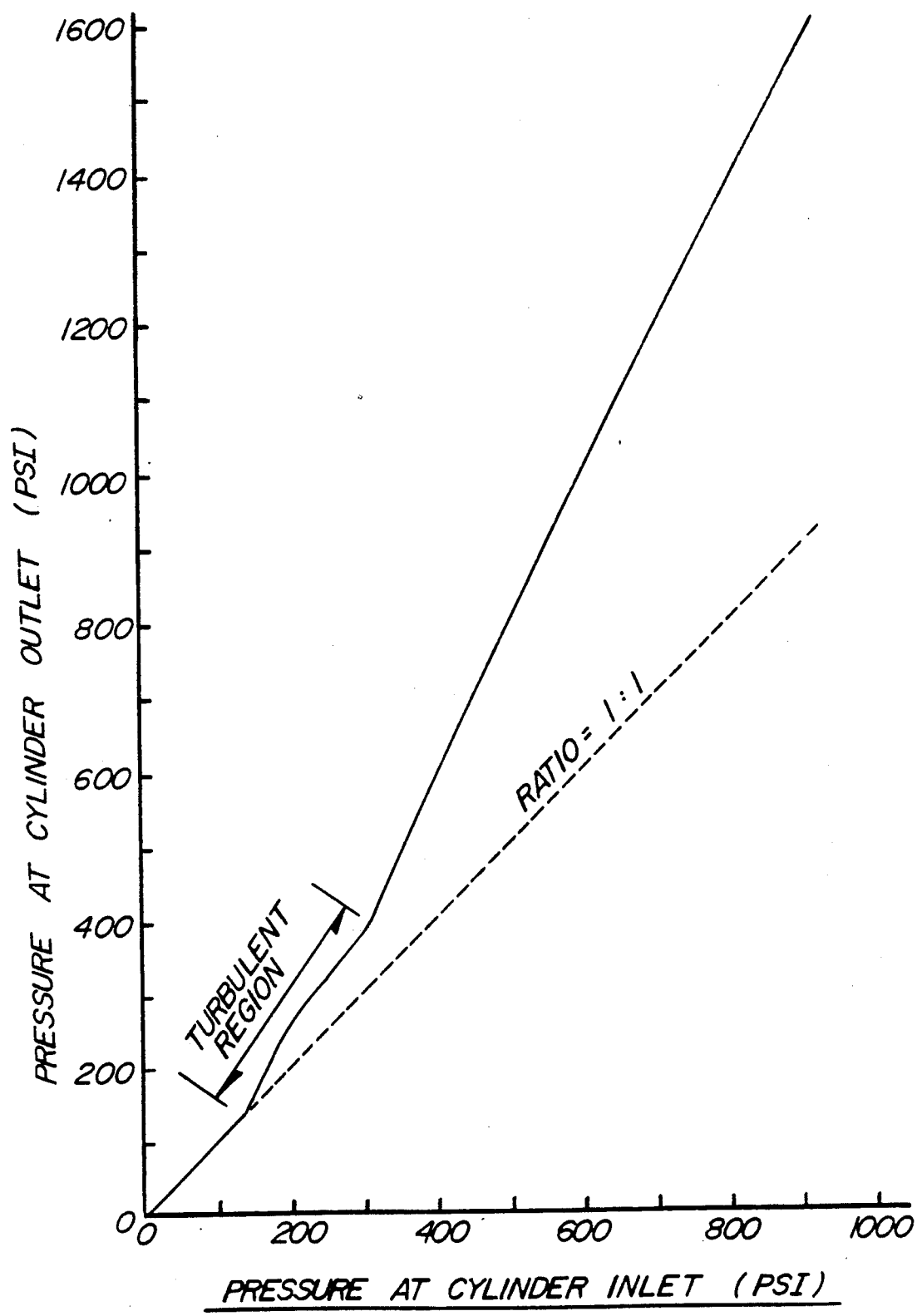
FIG. 9 is a graph showing the erratic pressure intensification provided by similar prior art devices.

When the various piston ratios are determined according to the aforementioned critical range, a smooth pressure intensification may be realized, as opposed to the prior art. Referring now to FIG. 9, a graphic representation is shown of a typical prior art pressure intensifying apparatus utilizing two telescoping pistons but whose ratios fall outside the critical range of the subject invention. It will be seen that a Turbulent Region exists from the point at which the valve means 66 closes, preferably about 150 psi, to a substantially higher pressure, usually about 300–400 psi, at the inlet end 44 of the cylinder 42. During this Turbulent Region, non-uniform and irregular pressure intensification values are generated at the outlet end 46 of the cylinder 42. This means that unpredictable pressures will be applied to the brake wheel cylinders and possibly cause an under-braking or over-braking condition.

Figure 10:
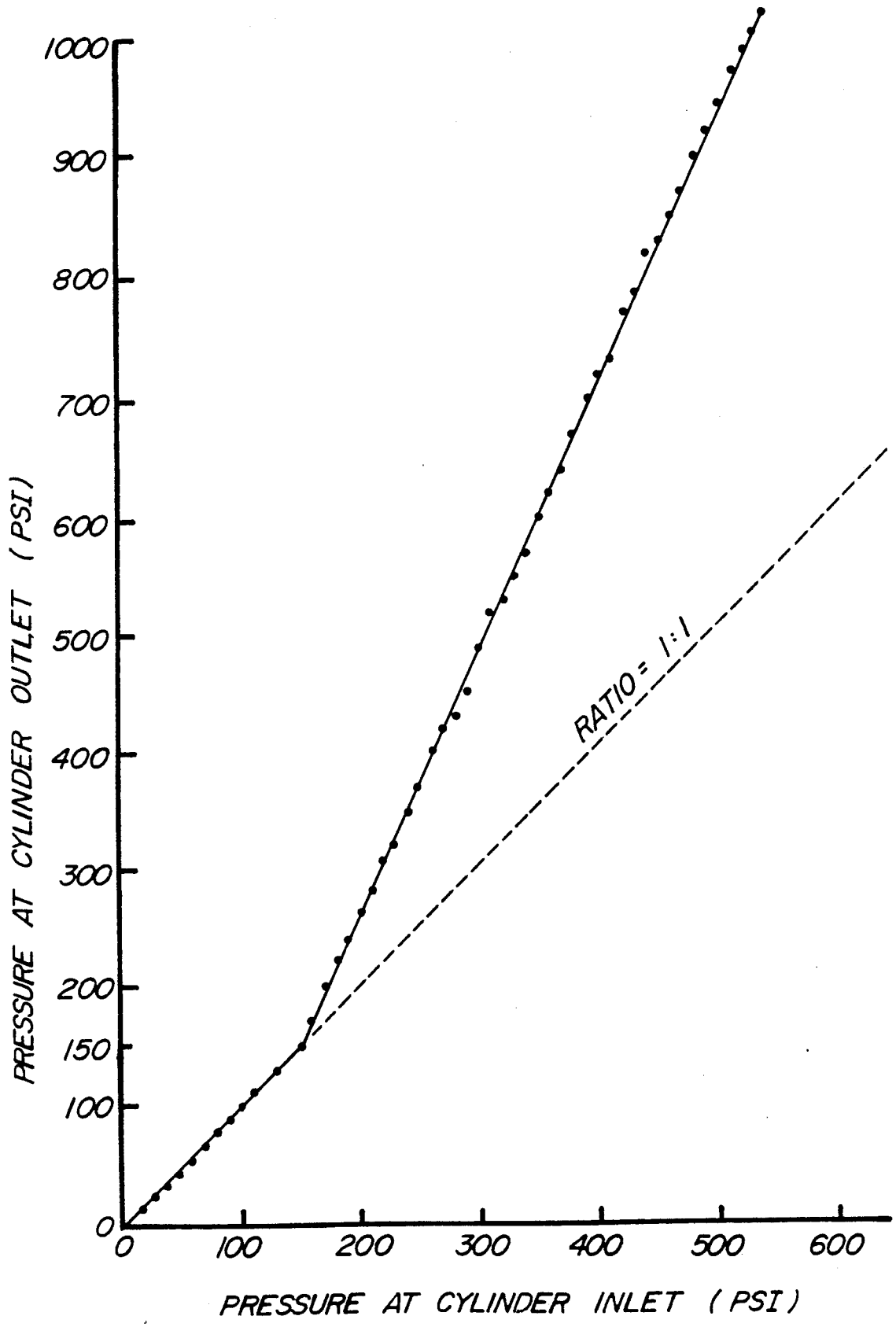
FIG. 10 is a graph showing the smooth pressure intensification provided by the subject invention.

However, by properly selecting piston ratios within the critical ranges set forth above, a smooth and predictable pressure amplification can be achieved, as shown in FIG. 10. It is clear from the graph of FIG. 10 that the subject critical ranges will completely eliminate the Turbulent Region phenomena and provide a regular pressure amplification which will not have the tendency of producing an over-braking or under-braking condition. Therefore, the subject critical ranges yield a safer apparatus 10.

Figure 11:
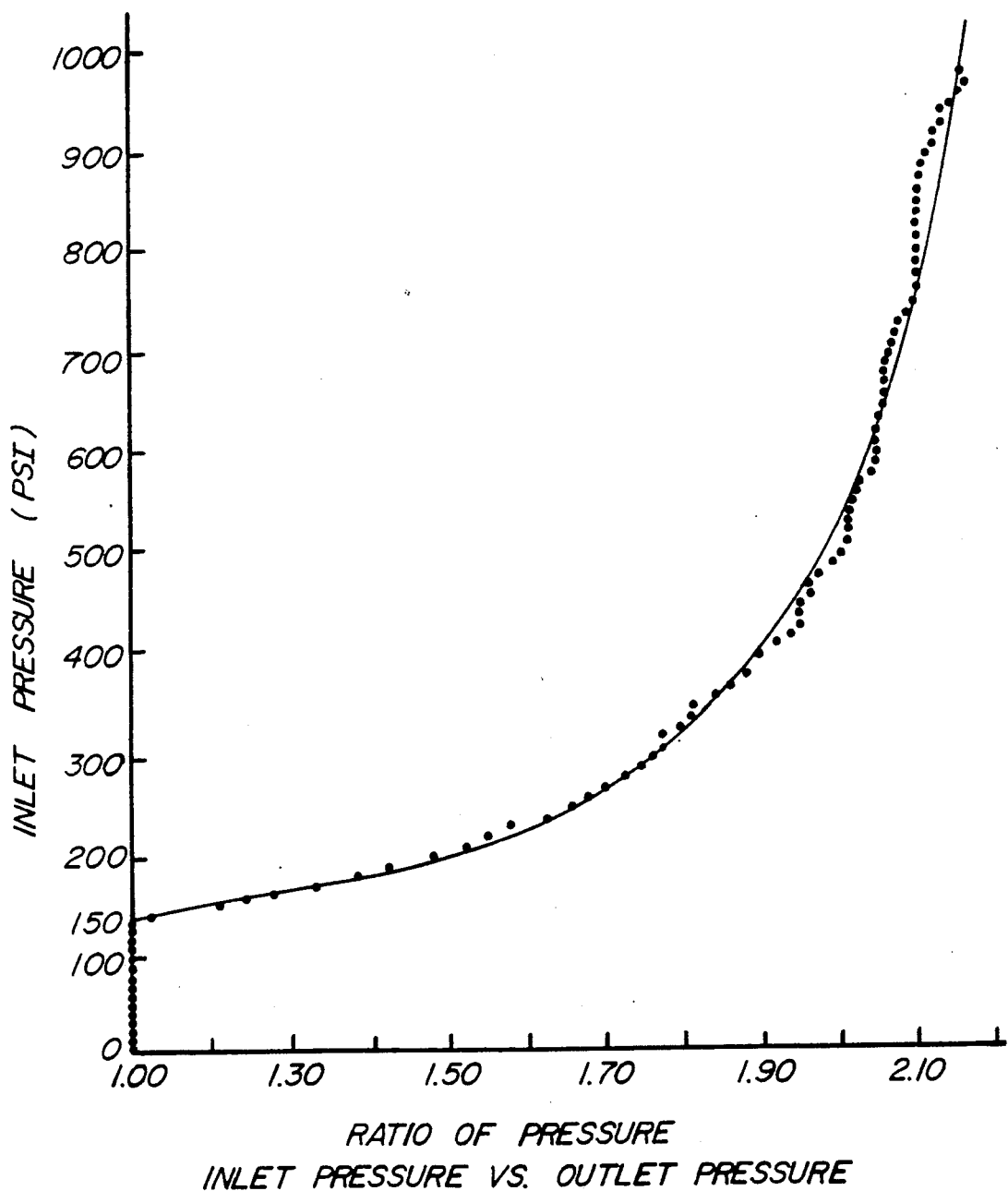
FIG. 11 is a graph showing the ratio of inlet to outlet pressures over a range of inlet pressures.

FIG. 11 illustrates the pressure ratio between the inlet 44 and outlet 46 pressures at increasing inlet 44 pressures. Although the best curve is shown passing through the individual data points, it can be seen by reference to the individual data points that fluctuations occur because of the moving of the first 54 and second 56 pistons relative to one another. The fact that these fluctuations are relatively minor, i.e., that they do not depart greatly from the best curve drawn through the data points, testifies to the improved results obtained when the piston 54, 56 ratios are determined using the aforesaid critical ratios.

Therefore, the subject invention provides significantly improved results by determining the first 54 and second 56 pistons according to the following critical ranges: the ratio of the end areas of the first piston 54 is between 60% and 70% of the ratio of the end areas of the combined first 54 and second 56 pistons, and the ratio of the end areas of the combined first 54 and second 56 pistons is between 80% and 90% of the ratio of the end areas of the second piston 56.

The outer rim 58 of the second piston 56 is restricted in its axial movement by a second inner ledge 104 of the first piston 54. In order to prevent hydraulic lock in the space between the first 54 and second 56 pistons and between the rim 58 and the second ledge 104, at least one port 106 is provided through the wall of the first piston 54 to allow hydraulic fluid to pass to and from the chamber 90. Therefore, as the pistons 54, 56 move relative to the cylinder 42 and relative to each other, fluid is continually moved to and from the chamber 90.

As shown in FIG. 2, the preferred embodiment of the subject invention 10 includes a plurality of strategically located glide rings 108. The glide rings 108 are disposed between the first piston 54 and the cylinder 42 and between the first piston 54 and the second piston 56. The glide rings 108 are self-lubricating O-ring type seals fabricated from a Teflon material. Teflon is preferred because it will swell when contacted by the hydraulic fluid to perfect a pressure impregnable seal, while at the same time depositing a thin film of the hydraulic fluid onto the surface of the associated travelling piston 54 or 56 to provide lubrication. Also, Teflon is preferred due to its tough wearing characteristics.

When pressure on the brake pedal 12 is released, or subsided, the first 54 and second 56 pistons move in reverse order to that described above back to the initial unactuated position shown in FIG. 5.

Because the pressures at the outlet end 46 of the cylinder 42 are much greater, up to several times greater, than the pressures at the inlet end 44 of the cylinder 42, the frustoconical sealing portion 72 is provided on the valve member 70 to provide a superior seal with the seat surface 64 of the flow passage 62. The specific shape of these elements prevents leakage of fluid through the flow passage 62 during the highest pressure phases of operation to allow the highest output pressures to be achieved. Such pressures were not achievable in the prior art hydraulic brake pressure intensifying apparatuses wherein the valve member comprised a spherical ball which engaged the seat surface of the flow passage only along a circular line.

Optimal operation of the subject invention 10 is dependant upon several factors. The first factor is referenced above wherein the relative ratios of the first 54 and second 56 pistons are determined according to the stated critical ranges in order to achieve the smooth, gradual transition of pressure intensification. The second factor comprises a carefully calculated pin 68 length to determine exactly the pressure at which the valve means 66 closes off the flow passage 62. The third factor is related to the second factor and comprises the selection of a spring 60 having a spring constant calculated to exert an optimal resistance on the piston means 52. The fourth factor comprises providing a sufficiently large enough reservoir 28 in the master cylinder 26 to supply the volume of brake fluid required while the first 54 and second 56 pistons move in the cylinder 42. Superior results are achieved when each of these factors are optimally calculated and implemented in the subject invention 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A hydraulic brake pressure intensifying apparatus (10) comprising:
   a fluid cylinder (42) extending axially between an inlet end (44) and an outlet end (46);
   a first piston (54) slideably disposed in said cylinder (42), said first piston (54) including a first forward end area adjacent said inlet end (44) and a first rearward end area smaller than said first forward end area adjacent said outlet end (46);
   a second piston (56) disposed for telescopic sliding movement within said first piston (54), said second piston (56) including a second forward end area adjacent said inlet end (44) and a second rearward end area smaller than said second forward end area adjacent said outlet end (46);
   a flow passage (62) communicating hydraulic fluid between said inlet (44) and outlet (46) ends of said cylinder (42);
   valve means (66) moveable between open and closed positions for preventing fluid flow through said flow passage (62) when in said closed position;
   said first (54) and second (56) pistons having a combined forward end area when said valve means (66) is in said closed position, and said first (54) and second (56) pistons having a combined rearward end area when said valve means (66) is in said closed position;
   and characterized by the ratio between said first forward end area and said first rearward end area being between 60 percent and 70 percent of the ratio between said combined forward end area and said combined rearward end area, and the ratio between said combined forward end area and said combined rearward end area being between 80 percent and 90 percent of the ratio between said second forward end area and said second rearward end area.

2. An apparatus (10) as set forth in claim 1 further characterized by said second piston (56) including an inner chamber defined by an annular inner wall (76); biasing means (60) disposed in said cylinder (42) for urging said first (54) and second (56) pistons axially toward said inlet end (44) of said cylinder (42); said valve means (66) being disposed in said inner chamber of said second piston (56) and including a frustoconical valve member (70) and said flow passage (62) including a matingly shaped seat surface (64) for mating engagement with said valve member (70) over a frustoconically shaped surface area to seal fluid flow through said flow passage (62) at elevated pressure, and said valve means (66) including an integral guide portion (74) extending axially from said frustoconical valve member (7) and including a plurality of outwardly extending splines for slideably engaging said inner chamber of said second piston (56) and slideably supporting said valve means (66) in said inner chamber while allowing hydraulic flow through said inner chamber between said splines.

3. An apparatus (10) as set forth in claim 2 wherein said valve member (70) includes a frustoconical sealing surface (72) for engaging said seat surface (64) further characterized by said valve member (70) including an annular elastomeric ring (86) disposed along said frustoconical sealing surface (72).

4. An apparatus (10) as set forth in claim 3 further characterized by said frustoconical seat surface (64) including an annular elastomeric ring (84) disposed so as to be spaced from said annular elastomeric ring (86) of said valve member (70) when said seat surface (64) and said sealing portion (72) are engaged.

5. An apparatus (10) as set forth in claim 4 further characterized by including a Teflon glide ring (108) disposed between said cylinder (42) and said first piston (54).

6. An apparatus (10) as set forth in claim 5 further characterized by including a Teflon glide ring (108) disposed between said first piston (54) and said second piston (56).

* * * * *